United States Patent [19]

Johnson et al.

[11] 4,032,689
[45] June 28, 1977

[54] CONSTRUCTION LAMINATE OF PLASTIC FOAM BETWEEN PAPER SHEETS

[75] Inventors: Frederick M. Johnson; James R. Brown; Rex L. Reitz, all of Austin, Tex.

[73] Assignee: Insulex, Inc., Austin, Tex.

[22] Filed: Oct. 14, 1975

[21] Appl. No.: 621,668

Related U.S. Application Data

[63] Continuation-in-part of Ser. No. 528,040, Nov. 29, 1974, abandoned.

[52] U.S. Cl. .................................. 428/55; 428/138; 428/314; 428/320; 156/196; 156/242; 9/6 R; 9/6 P; 52/309.8
[51] Int. Cl.[2] ...................... B32B 5/18; B32B 3/16; B63B 5/24; E04C 5/07
[58] Field of Search ............. 428/55, 138, 47, 174, 428/370, 314; 9/6 P, 6 R, 47, 314; 52/309; 156/196, 242

[56] References Cited

UNITED STATES PATENTS

| | | | |
|---|---|---|---|
| 3,016,317 | 1/1962 | Brunner | 428/138 X |
| 3,506,533 | 4/1970 | Berner | 428/320 X |
| 3,511,743 | 5/1970 | Rach | 428/138 X |
| 3,591,443 | 7/1971 | Cox | 428/47 |
| 3,841,958 | 10/1974 | Delorme | 428/117 |

*Primary Examiner*—Philip Dier
*Attorney, Agent, or Firm*—Arnold, White & Durkee

[57] ABSTRACT

A construction element having a high strength to weight ratio, particularly useful in the fabrication of a boat hull, the construction element comprising:

a first face layer of resin impregnated glass fiber cloth or glass fiber matting;

an intermediate stiffening member comprising a laminate of:
a. a flexible top sheet, preferably of paper;
b. an intermediate foam layer, bonded to the top sheet; and
c. a flexible bottom sheet, preferably of paper, bonded to the intermediate foam layer on the side opposite the top paper sheet; the laminate having:
  i. a first series of spaced slits extending through the top sheet and intermediate foam layer but not through the bottom sheet;
  ii. a second series of spaced slits parallel to the first series of spaced slits and extending through the bottom sheet and intermediate foam layer but not through the top sheet, the second series of spaced slits being offset from the first series of spaced slits;
  iii. a third series of spaced slits perpendicular to the first and second series of spaced slits, the third series of spaced slits extending through the top sheet and intermediate foam layer but not through the bottom sheet; and
  iv. a fourth series of spaced slits parallel to the third series of spaced slits and extending through the bottom sheet and intermediate foam layer but not through the top sheet, the fourth series of spaced slits being offset from the third series of spaced slits; and a second face layer of resin impregnated glass fiber cloth or glass fiber matting.

12 Claims, 6 Drawing Figures

CONSTRUCTION LAMINATE OF PLASTIC FOAM BETWEEN PAPER SHEETS

RELATED APPLICATION

This application is a continuation-in-part of application Ser. No. 528,040, filed on Nov. 29, 1974, now abandoned.

BACKGROUND OF THE INVENTION

1. FIELD OF THE INVENTION

This invention relates to a stiffening element which possesses stiffness and strength with a minimum of weight, such stiffening element being particularly useful in the manufacturing of the contoured curved surface of a boat hull, the stiffening element comprising the intermediate layer between settable resin impregnated glass fiber sheets. More particularly, the present invention is directed to such stiffening element and method of fabricating a boat hull therewith, wherein the stiffening element comprises a layer of plastic foam with top and bottom skins or sheets, preferably of paper, the laminate having a plurality series of slits which provide deformability and flexibility in a plurality of directions.

2. DESCRIPTION OF THE PRIOR ART

Laminates of a plastic foam between outer sheets or skins of paper or cardboard have been previously developed, principally as a material for use in the production of cartons or similar containers. This type of construction is illustrated, for example, in U.S. Pat. No. 2,770,406 to Lane, which illustrates a carton formed of a plastic foam sandwiched between two outer sheets of paper, preferably Kraft paper.

This type of sandwich construction has also made its way into the boat industry as illustrated, for example, by U.S. Pat. No. 3,092,851 to Sauer. The boat illustrated in this patent is made from a waterproof board or heavy sheet material which can be readily scored and folded along predetermined curved fold lines, with a particularly suitable sheet material comprising a laminate of paper and polystyrene foam, a preferred material being one sold under the trademark FOME-COR. In accordance with the Sauer patent, the flat foldable board is scored or otherwise processed to define a series of foldably connected panels which form the bottom, sides and top of the boat. It is suggested that, by using a foldable board, one avoids the problem of seams below water level, and, through the proper shaping of the panels, one can avoid or at least minimize the need for framework or bracing.

The usefulness of a boat fabricated from a laminate of plastic foam between outer skins or sheets of paper or board is, of course, quite limited. And, this type of construction is apparently useful only where strength and rigidity are not required. However, due to the buoyancy characteristics of plastic foams, such plastic foams have in the past been made an integral portion of boat construction, particularly where other construction elements are present to provide the desired strength and rigidity characteristics, the plastic foam allowing the production of a boat hull having a high strength to weight ratio. Representative examples of this type of construction are illustrated in U.S. Pat. No. 3,668,051 to Seemann and U.S. Pat. No. 3,687,768 to Vaitses.

The Seeman patent above describes a method of constructing boat hulls using fiberglass, wherein a surface defining base material of a pliable sheeting, for example, a loosely woven fabric or elastic mesh reinforced with springy rods is attached to a skeleton framework which readily and easily assumes and forms the contoured curved surface of the boat hull, with subsequent addition of a resin and hardening of the resin. The disadvantages of this type of boat hull construction are many. Foremost, however, are the disadvantage of the necessary employment of a skeleton framework and the complicated multi-step or stage procedure necessary to apply the various layers which eventually make up the contoured curved structure of the boat hull. Accordingly, a method such as described in the Seeman patent is not practical from the standpoint of providing a low-cost yet strong fiberglass boat hull.

The Vaitses patent describes an improved method of forming a laminated boat hull using a mold, thereby eliminating the skeleton structure employed in the Seemann patent. The method described in Vaitses comprises the steps of laying up on the mold a first skin, e.g., a settable resin impregnated fiberglass fabric; placing upon the first skin a first set of substantially parallel spaced elongated members, e.g., polyurethane foam members; laying a continuous membrane adhering to the exposed portions of the first skin; placing a second set of substantially parallel spaced elongated members upon the continuous membrane so as to substantially fill the interstitial valleys between the members of the first set; and laying up a second skin, e.g., resin impregnated fiberglass fabric upon the second set of elongated members, and upon the exposed portions of the continuous membrane so as to complete the boat hull.

The method of fabricating in the Vaitses patent suffers from various disadvantages, the major disadvantage of which is the necessity of placing first and second sets of spaced members in a particular relationship to one another and in a particular spaced relationship of the members within each set. This requires time-consuming placement of individual members with the great possibility that structural strength in the boat hull can be lost due to misplacement or misalignment of elements. This, coupled with the fact that the method of construction described in the Vaitses patent requires a great number of steps to be carried out in a particular sequence and time interval makes such method somewhat less than totally satisfactory.

Copending application ser. No. 508,690 filed Sept. 23, 1974, now U.S. Pat. No. 3,920,871 in the name of Frederick M. Johnson and directed to Woven Structural Element, Method of Manufacture Thereof, and Method of Making a Boat Hull Therefrom, such application and this application being commonly assigned, discloses an improvement over the foregoing constructions, utilizing a plastic foam in the fabrication of a laminated boat hull, providing a product with a high strength to weight ratio. The structural element which is described in such copending application broadly comprises parallel rows of alternately oppositely undulated bundles of substantially untwisted fiberglass rovings and a series of parallel foamed plastic slats extending transversely of such rows and alternately under and over adjacent bundles so as to define a woven structural elements of foamed plastic slats and bundles of fiberglass rovings. The weave of the woven structural element allows the element to take the form of a curved surface, preferably the contoured curved surface of a boat hull. Impregnation of the structural element with a settable resin and subsequent setting of the resin produces a structural element having a high strength to weight ratio. The resin impregnation of the woven structure provides for I-beams of resin between the foamed plastic slats with X-reinforcement of glass rovings therein. In utilization of such structural element in the production of a boat hull, the resin impregnated structural element is utilized as a central buoyancy element between first and second face sheets of resin impregnated fiberglass matting or woven fiberglass cloth.

While the structural element described in such copending application is extremely effective as the central buoyancy element in the fabrication of a laminated boat hull, the weaving of fiberglass rovings and foamed plastic slats increases the cost of the fiberglass boat hull. Accordingly, the art has still sought an inexpensive stiffening element for the fabrication of boat hulls, which can create the desired buoyancy and stiffening at extremely low cost.

It has previously been known that cuts or slits can be formed in a foam product to achieve various results. For example, a product manufactured by Owens-Corning under the name GLASSPAK, in accordance with U.S. Pat. Nos. 3,627,603 and 3,647,588 to J.W. Greig has a plurality of score lines, some of which start at one surface of the foam product, and others of which start at the opposite surface. Since this is a unitary foam product, however, these score lines or slits do not provide the necessary flexibility for utilization of such foam product in the fabrication of a curved surface, such as the contoured curved surface of a boat hull. Accordingly, prior to the present invention, the art still sought an inexpensive stiffening element providing stiffness and buoyancy for the fabrication of a boat hull, which stiffening element was extendable in a plurality of directions, making the same eminently useful in the fabrication of the contoured curved surface of a boat hull.

SUMMARY OF THE INVENTION

It is within the foregoing background that the stiffening element and method of the present invention were developed, the stiffening element in accordance with the present invention comprising a laminate of:

a. a flexible top or first sheet;

b. an intermediate foam layer, bonded to the top sheet; and c. a flexible bottom or second sheet bonded to the intermediate foam layer on the side opposite the top sheet, the laminate having:

i. a first series of spaced slits extending through the top sheet and intermediate foam layer but not through the bottom sheet;

ii. a second series of spaced slits parallel to the first series of spaced slits and extending through the bottom sheet and intermediate foam layer but not through the top sheet, the second series of spaced slits being offset from the first series of spaced slits;

iii. a third series of spaced slits perpendicular to the first and second series of spaced slits, the third series of spaced slits extending through the top sheet and intermediate foam layer but not through the bottom sheet; and iv. a fourth series of spaced slits parallel to the third series of spaced slits and extending through the bottom sheet and intermediate foam layer but not through the top paper sheet, the fourth series of spaced slits being offset from the third series of spaced slits.

Preferably, in accordance with the present invention, the stiffening element is one in which the slits in each of the first through fourth series of spaced slits are evenly spaced, with the first series of spaced slits being offset from the second series of spaced slits and the third series of spaced slits being offset from the fourth series of spaced slits a distance equal to about ten percent to about 50 percent of the distance between adjacent slits in the first through fourth series of spaced slits. Such offset is preferably a distance of from about one-fourth to one-half inch.

In constructing a boat hull utilizing the above described stiffening element, such stiffening element is employed as an intermediate member between a first face layer of settable resin impregnated glass fiber cloth or glass fiber matting and a second face layer of settable resin impregnated glass fiber cloth or glass fiber matting. In an alternate embodiment, the intermediate stiffening member described above can itself be impregnated with a settable resin, the boat hull then being prepared by setting each of the settable resins.

The method of the present invention comprises forming a boat hull using a mold by carrying out the steps of:

a. laying upon the mold a first face sheet of settable resin impregnated glass fiber cloth or glass fiber matting;

b. placing on such first face sheet an intermediate stiffening member as above described;

c. laying upon the intermediate stiffening member a second face sheet of settable resin impregnated glass fiber cloth or glass fiber matting; and d. setting the settable resins.

Again, in an alternate embodiment of the present invention, the intermediate stiffening member may be impregnated with a settable resin before laying the second face sheet.

The stiffening element of the present invention advantageously provides stiffening and strength without adding substantial weight to the construction in which it is utilized. Moreover, the deformability of the element of the present invention in a plurality of directions allows the same to effectively take the contoured curved surface of a boat hull. In addition to such utilization, however, the stiffening element of the present invention is eminently suited for the fabrication of other construction elements where a high strength to weight ratio is required, such as, for example, in the fabrication of boat decks, hatch covers, bait wells, coolers, and other products. In this regard, the stiffening element of the present invention provides insulation and flotation characteristics in addition to a high strength to weight ratio.

Accordingly, it is a principal feature of the present invention to provide a novel stiffening element, a construction element including the same, and a method of manufacturing a boat hull using such stiffening element, wherein the disadvantages of prior art materials are eliminated, and the stiffening element provides a high strength to weight ratio, insulation and flotation characteristics, the stiffening element being deformable in a plurality of directions, making the same eminently suited in the fabrication of the contoured curved surface of a boat hull.

It is a further feature of the present invention to provide such stiffening element and method of fabricating a boat hull therefrom, wherein the element comprises a top sheet, an intermediate foam layer bonded to the top sheet, and a bottom sheet bonded to the intermediate foam layer on the side opposite the top sheet, the laminate having a plurality of series of spaced slits to provide deformability in a plurality of directions.

It is yet a further feature of the present invention to provide such stiffening element wherein the laminate of a top sheet, preferably of paper, an intermediate foam layer and bottom sheet, preferably of paper, includes first through fourth series of spaced slits, the third and fourth series of spaced slits being perpendicular to the first and second series of spaced slits, the first series of spaced slits being offset with respect to the second series of spaced slits, and the third series of spaced slits being offset with respect to the fourth series of spaced slits, no single slit extending through the entire laminate, whereby the stiffening element is deformable in a plurality of directions, making the same eminently suited in the fabrication of the contoured curved surface of a boat hull.

Yet a further feature of the present invention relates to a construction element for boat hulls and a method of forming boat hulls from such construction element, the construction element comprising a first face layer of settable resin impregnated glass fiber cloth or glass fiber matting, an intermediate stiffening member comprising a laminate of a top sheet, an intermediate foam layer and a bottom sheet as above described, and a second face layer of settable resin impregnated glass fiber cloth or glass fiber matting.

Still further features and advantages of the stiffening element, construction element for boat hulls and method of fabricating a boat hull therefrom will become more apparent from the following more detailed description of the present invention, particularly in connection with the accompanying drawings.

BREIF DESCRIPTION OF THE DRAWINGS

In the attached drawings, which represent preferred embodiments of the present invention only:

DESCRIPTION OF PREFERRED EMBODIMENTS

Figure 1:
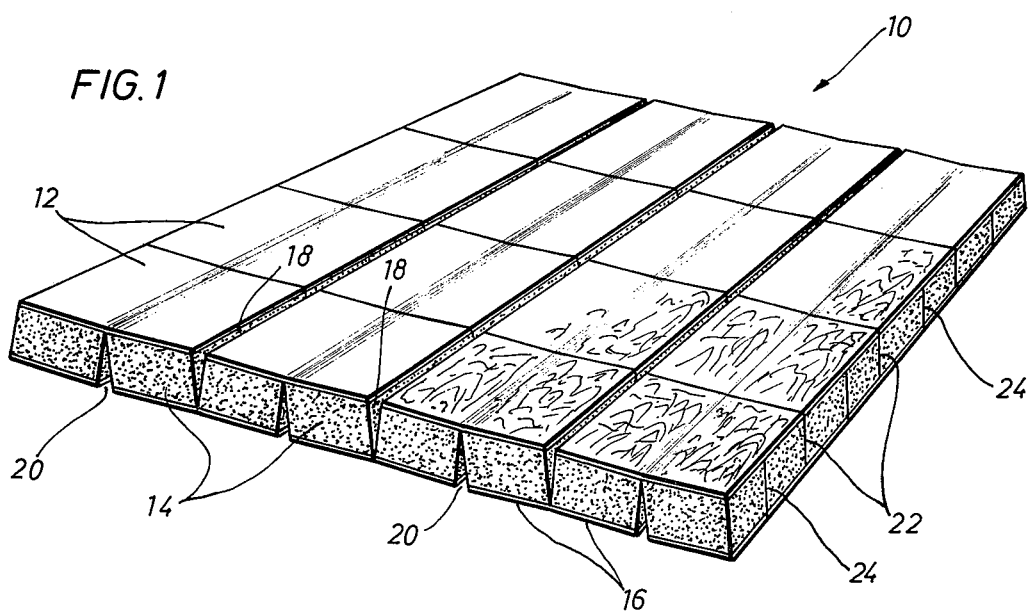
FIG. 1 is a perspective view of the stiffening element of the present invention, illustrating the laminate of top and bottom sheets and intermediate foam layer, and deformability achieved by spaced slits.

As shown in the drawings, with specific reference to FIG. 1, the novel stiffening element 10 of the present invention is a laminate of a top or first sheet 12, an intermediate foam layer 14 bonded to the top or first sheet 12 and a bottom or second sheet 16 bonded to the intermediate foam layer 14 on the side opposite the top or first sheet 12.

In accordance with the present invention top sheet 12 and bottom sheet 16 are preferably made of any suitable paper or paper board. Preferably, however, top sheet 12 and bottom sheet 16 of the stiffening element 10 of the present invention are sheets of Kraft paper, with a 40-pound Kraft paper being found particularly applicable in accordance with the present invention. The present invention is, of course, not limited to the use of Kraft paper, and any paper or paper board product capable of forming a laminate with an intermediate plastic foam can be advantageously utilized in accordance with the stiffening element, structural element for boat hulls, and method of fabricating a boat hull in accordance with the present invention.

Also, while the use of paper sheets is preferred, in certain applications it may be desirable to form top sheet 12 and bottom sheet 16 from a different material, including, for example, films of polymeric material, metal foils, etc. Accordingly, each of these embodiments is within the scope of the present invention, and the top and bottom sheets need only be flexible so as to create a hinge-type effect and achieve the advantages of the present invention. In further discussing preferred embodiments in connection with the drawings, however, reference will be made to the preferred employment of a top paper sheet 12 and bottom paper sheet 16.

In accordance with the present invention, intermediate foam layer 14 can be formed of any cellular plastic or foam, i.e., a plastic material with numerous cells disposed throughout its mass. The intermediate foam layer 14 in accordance with the present invention provides the desirable high strength to weight ratio which is achieved in stiffening element 10. Preferably, intermediate foam layer 14 is formed from a urethane foam, a material often referred to as a polyurethane foam or isocyanate foam. These cellular plastics are a part of a class of materials in which the chemical reaction causing foaming occurs simultaneously with the polymer-forming reaction. Generally, in the case of polyurethane resins, the polymeric constituent of the urethane foam is made by reacting a polyol, either a polyether or polyester, with an isocyanate. When the isocyanate is in excess of the amount that will react with the polyol and when water is present, the excess isocyanate will react with water to produce carbon dioxide which expands the mixture. This procedure for the production of urethane foams is well known in the art and will not be further discussed here. In effect, any and all methods of producing urethane foams and any and all typically produced urethane foams can be advantageously utilized in the formation of the intermediate foam layer 14 useful in stiffening element 10 of the present invention.

While the use of the urethane foam is preferred in accordance with the present invention, intermediate foam layer 14 can be advantageously prepared from other plastic materials. All that is required is that the plastic material utilized in the formation of intermediate foam layer 14 be capable of providing a stiffening element 10 of a high strength to weight ratio. Other typical materials include, for example, foamed polystyrene, foamed epoxy resins, foamed ABS resins, foamed cellulose acetate resins, foamed phenolic resins, foamed polyethylene and polypropylene, as well as other foamed polymers. In addition, while the use of a foamed plastic is greatly preferred in accordance with the present invention, it is possible that for some applications a portion of the foamed plastic can be replaced with other lightweight structural elements such as wood, aluminum, etc. These embodiments, therefore, must be considered to be within the scope of the present invention.

The laminate of top paper sheet 12, intermediate foam layer 14, and bottom paper layer 16 can be formed in any suitable manner, and generally does not require the use of any adhesive material, due to the adhesive affinity of the intermediate foam layer 14 for the paper sheets 12 and 16. For example, when utilizing the preferred polyurethane foam, a liquid urethane prepolymer can be extruded between top and bottom paper sheets and foamed in situ. This procedure, which is well known in the formation of foam laminates, is preferably carried out to fabricate the stiffening element 10 of the present invention. Such foaming in situ of the plastic foam forms a firm adhesive bond between the intermediate foam layer 14 and the top and bottom paper sheets 12 and 16.

In order to create even a stronger bond between the intermediate foam layer 14 and the top and bottom paper sheets 12 and 16, in a preferred embodiment of the present invention, the paper or paper board utilized for top and bottom paper sheets 12 and 16 is a Kraft paper having a "fuzzy" surface, with the threads or hairs protruding from the surface assisting in the adhesive attachment due to incorporation within the foam upon in situ foaming.

Figure 2:
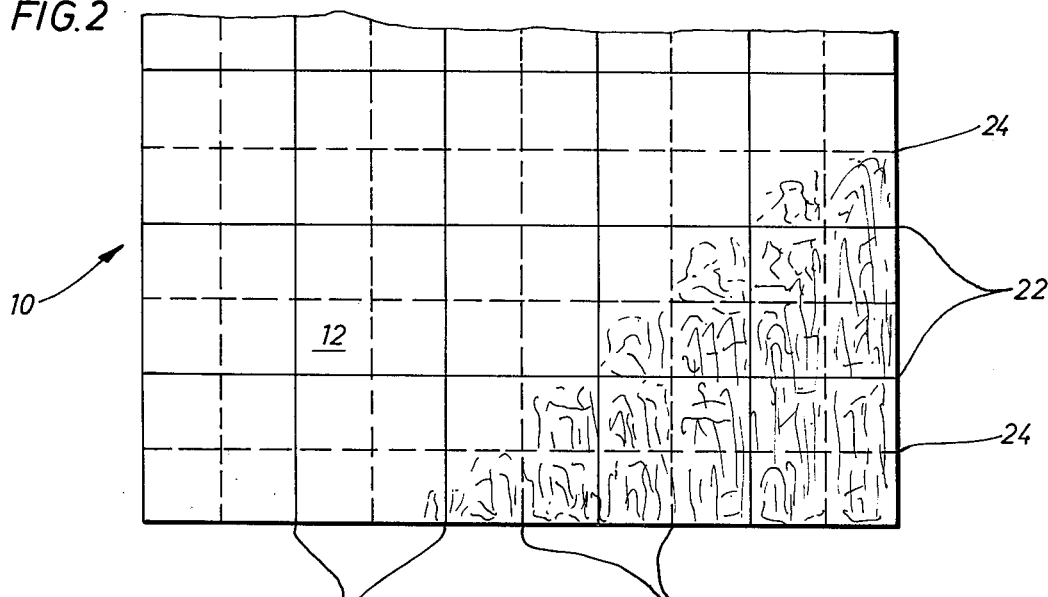
FIG. 2 is a top view of a portion of the stiffening element of the present invention showing the relationship between the first through fourth series of spaced slits.

As illustrated in FIGS. 1 and 2, flexibility is achieved in accordance with the present invention by providing the stiffening element 10 with a plurality of spaced slits which, as will be described below, allow the stiffening element 10 of the present invention to be deformable in a plurality of directions. While it may appear at first to be somewhat inconsistent to describe element 10 as a stiffening element and at the same time refer to the flexibility or deformability thereof, these functions are achieved in accordance with the present invention through the structure illustrated and described since the flexibility or deformability allows the stiffening element 10 to take the shape of a curved surface, particularly the contoured curved surface of a boat hull, and, after fabrication of a suitable structural element utilizing stiffening element 10, such as a boat hull, the thickness of stiffening element 10, particularly when resin impregnated, creates the desired stiffness in the structural element.

As illustrated in FIGS. 1 and 2, structural element 10 in accordance with the present invention includes a first series of spaced slits 18 which extend through the top paper sheet 12 and intermediate foam layer 14 but do not extend through the bottom paper sheet 16. In order to provide an integral element, no single slit can extend entirely through the laminate of the top and bottom paper sheets 12 and 16 and intermediate foam layer 14.

As illustrated, the first series of spaced slits 18 is such that the spaced slits 18 are evenly spaced across the stiffening element 10. While this even spacing of slits 18 is preferred in accordance with the present invention, it is, of course, possible to deviate from such even spacing without deviating from the scope of the present invention.

As illustrated in FIGS. 1 and 2, the stiffening element 10 of the present invention includes a second series of spaced slits 20 running parallel to the first series of spaced slits 18. Spaced slits 20, however, extend through the bottom paper sheet 16 and intermediate foam layer 14, but not through the top paper sheet 12. Moreover, as illustrated, the first series of spaced slits 18 is offset from the second series of spaced slits 20 so that, again, no single slit extends through the entire laminate. In accordance with the preferred embodiment, spaced slits 20 are again evenly spaced across the stiffening element 10, and, most preferably, the spacing between slits 20 in the second series of spaced slits is substantially the same as the spacing between slits 18 in the first series of spaced slits so that the offset between adjacent slits 18 and 20 will be substantially uniform throughout the dimensions of the stiffening element 10.

Preferably, in accordance with the present invention, the first series of spaced slits 18 is offset from the second series of spaced slits 20, a distance equal to about 10 percent to about 50 percent of the distance between adjacent slits in the first and second series of spaced slits 18 and 20. Generally, this offset between the first series of spaces slits 18 and second series of spaced slits 20 will be a distance of about one-quarter to about one-half inch. Of course, deviations from these distances based upon the dimensions of the stiffening element 10 are clearly within the scope of the present invention.

With the first series of spaced slits 18 and second series of spaced slits 20 arranged as described, stiffening element 10 will be deformable in a single direction. While this may be sufficient for some purposes, when considering the contoured curved surface of a boat hull, deformability in a single direction will not allow the stiffening element 10 to take the form of such surface. Accordingly, to achieve deformability in a plurality of directions, stiffening element 10 in accordance with the present invention includes a further third series of spaced slits and fourth series of spaced slits parallel to each other and perpendicular to the first and second series of spaced slits 18 and 20.

As illustrated in FIGS. 1 and 2, a third series of spaced slits 22 is provided perpendicular to the first and second series of spaced slits 18 and 20. Like the first series of spaced slits 18, slits 22 of this third series of spaced slits extend through the top paper sheet 12 and intermediate foam layer 14, but not through the bottom paper sheet 16. The slits 24 of the fourth series of spaced slits are parallel to slits 22 of the third series of spaced slits, but extend through the bottom paper sheet 16 and intermediate foam layer 14, but not through the top paper sheet 12. Again, slits 24 are offset from slits 22 so that no single slit extends through the entire laminate.

As illustrated in FIGS. 1 and 2, in the preferred embodiment of the present invention, slits 22 of the third series of spaced slits are evenly spaced across the stiffening element 10. Likewise, in the preferred embodiment of the present invention, slits 24 of the fourth series of spaced slits are evenly spaced across the stiffening element 10, and, most preferably, the spacing between slits 22 of the third series of spaced slits and slits 24 of the fourth series of spaced slits is substantially the same, so that there is a uniform offset between adjacent slits 22 and 24 across the stiffening element 10. This spacing and offset can be the same as described in connection with the first and second series of spaced slits 18 and 20 or to achieve different degrees of deformability in different directions, the spacing and offset between the third and fourth series of spaced slits 22 and 24 can be different from the spacing and offset between the first and second series of spaced slits 18 and 20. Also, the frequency of the slits in any one series of spaced slits can vary from the frequency in any other series to achieve desirable differences in degree of deformability. Regardless of whether such spacing and offset is the same or different, in the preferred embodiment of the present invention, the third series of spaced slits 22 is offset from the fourth series of spaced slits 24, a distance equal to about 10 percent to about 50 percent of the distance between adjacent slits in the third and fourth series of spaced slits 22 and 24. Again, most preferably, based upon the typical dimensions of the stiffening element 10, the third series of spaced slits 22 is offset from the fourth series of spaced slits 24 a distance of from about one-fourth to about one-half inch. These dimensions can, of course, vary somewhat based upon the dimensions of the stiffening element 10.

Figure 3:
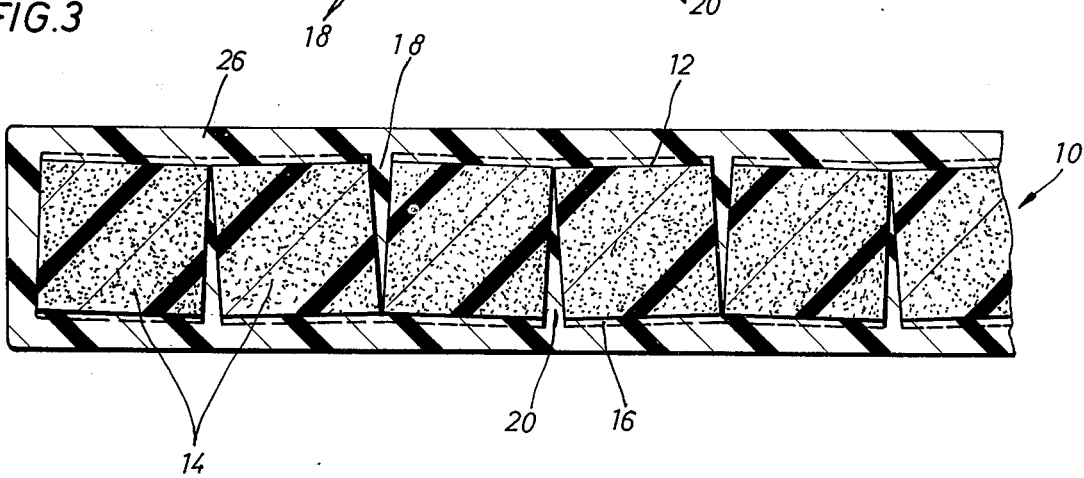
FIG. 3 is a cross-sectional end view of the stiffening element of FIG. 1 after resin impregnation.

FIG. 3 further illustrates the stiffening element 10 of the present invention after impregnation with a settable resin. In this respect, it is often advantageous in accordance with the present invention to impregnate the stiffening element 10 after it has been conformed to the desired surface, i.e., conformed to the shape of a mold in the formation of the contoured curved surface of a boat hull. As illustrated in FIG. 3, the settable synthetic resin forms upon setting an envelope of resin 26, which extends into the spaces formed by the slits 18 and 20 (also slits 22 and 24 not shown), thereby forming, upon setting, a very stiff element which, based upon its initial deformability, can conform to a curved surface, including the contoured curved surface of a boat hull.

While the settable resin is not limited to any particular type, preferable settable resins include polyesters and epoxy resins. These materials have been found to be particularly compatible with applicable paper or paper board sheets and plastic foams, so as to provide a unitary element having a high strength to weight ratio. Polyester resins are particularly applicable in accordance with the present invention.

It should be apparent that the settable resin utilized to form the elements such as illustrated in FIG. 3 can be any liquid substance which is capable of hardening or setting, either by chemical reactions or simple drying. Accordingly, as used throughout, the expression "settable resin" is meant to embrace any and all such materials without limitation as to any particular form or type of resin.

Figure 4:
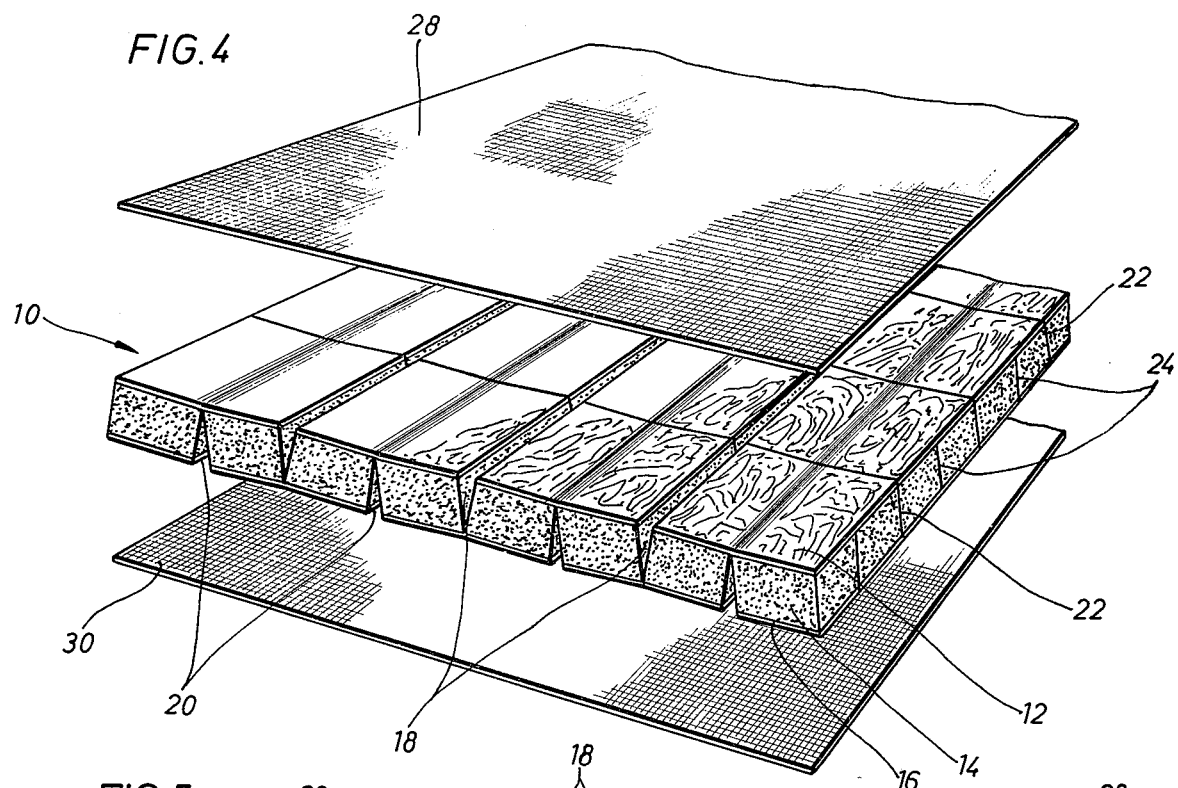
FIG. 4 is an exploded perspective view of the construction element in accordance with the present invention particularly suited for the fabrication of a boat hull.

FIG. 4 illustrates in exploded form a suitable construction element wherein stiffening element 10 is employed as an intermediate member between upper and lower sheets. The first sheet or first face layer 28 comprises one or more layers of a settable resin impregnated glass fiber cloth or glass fiber matting conventionally employed, for example, in the fabrication of a fiberglass boat hull. This first face layer or sheet may conventionally comprise a single ply or multiple plys of the settable resin impregnated glass fiber cloth or glass fiber matting. Here again, this material is conventionally employed in the fabrication of a fiberglass boat hull, with the resin being any of those described earlier in connection with the resin impregnation of the stiffening element.

As illustrated in FIG. 4, stiffening element 10 is sandwiched between such first face layer of settable resin impregnated glass fiber cloth or glass fiber matting 28 and a second face layer of settable resin impregnated glass fiber cloth or glass fiber matting 30. The characteristics of this second face layer are identical with those described above in connection with first face layer 28.

Figure 5:
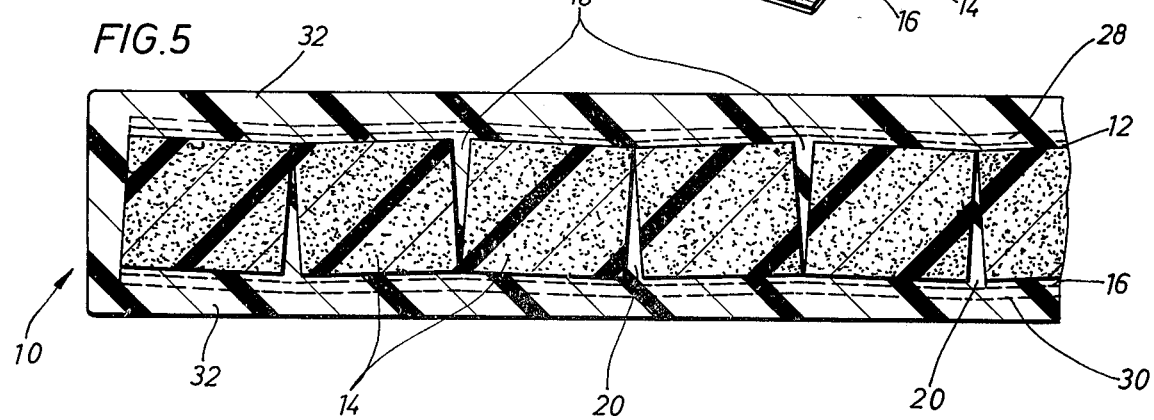
FIG. 5 is a cross-sectional end view of the construction element of FIG. 4, in unexploded condition and after resin impregnation.

Moreover, as illustrated in FIG. 5, in addition to resin impregnation of the first face layer 28 and second face layer 30, the intermediate stiffening element 10 of the present invention can also be resin impregnated so as to produce a resin envelope 32 which, in addition to impregnating the first and second face layers 28 and 30, impregnates the intermediate stiffening element 10 and fills the gaps formed by slits 18 and 20 (as well as slits 22 and 24, not shown). In this way, the entire structural element becomes rigid and stiff. Also, due to the deformability of the intermediate stiffening member prior to resin impregnation, such rigid constructional element can take the form of a curved surface, particularly the contoured curved surface of a boat hull.

The method of the present invention is advantageously carried out to form a boat hull utilizing the structural elements of the present invention to provide strength and stiffness with a minimum of weight. In forming any structural element from the stiffening element 10 of the present invention, the stiffening element is first formed into the desired form, e.g., the contoured curved surface of a boat hull, the stiffening element is impregnated with a settable resin, and the settable resin is allowed to set so that the stiffening element maintains the desired form. When utilizing such method to form a boat hull using a mold, the method can also include other conventional steps generally carried out in forming a fiberglass boat hull, with the requirement being that the stiffening element of the present invention is employed to create the necessary structural strength and stiffness with a minimum of weight, the structural element being employed as an intermediate buoyancy and stiffening element of the contoured curved surface of the boat hull.

In preparing a boat hull utilizing the structural element of the present invention, a conventional female mold having the desired shape of compound curvature is constructed by a manner well known in the art and prepared for preparation of the boat hull. Preparation of the mold generally includes application of a release coating and gel coat so that the fiberglass hull which is produced can be released from the mold and will be colored by the gel coat. These steps are, of course, conventional in the preparation of a fiberglass boat hull.

Figure 6:
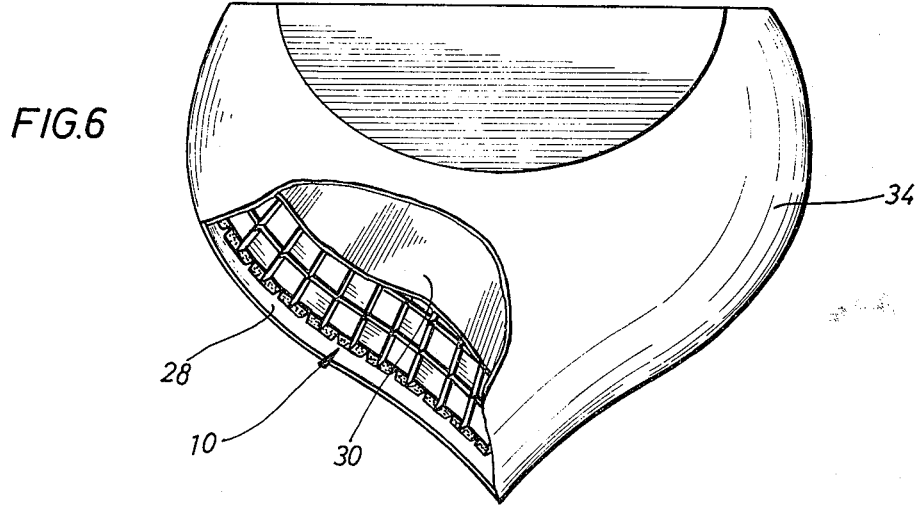
FIG. 6 is a view in partial corss-section, illustrating the use of the stiffening element of the present invention as an intermediate layer in the fabrication of the contoured curved surface of a boat hull.

As illustrated in FIG. 6, after preparation of the mold, construction of the boat hull 34 is begun by laying up on the mold a first face sheet 28, the first face sheet being a fiberglass matting or woven fiberglass cloth. Of course, more than one ply of fiberglass matting or woven fiberglass cloth can make up this first face sheet 28. The first face sheet 28 can be saturated or impregnated with a settable resin upon laying up, or, subsequent to laying up of the first face sheet 28, the face sheet can be saturated or impregnated with a settable resin. This settable resin is, of course, any of those previously discussed. Application of the fiberglass matting or fiberglass cloth of the first face sheet 28, impregnated with a settable resin or prior thereto, can be carried out by conventional means, such as with a chopper gun or hand layup. These techniques are those which have been previously employed in connection with the production of fiberglass boat hulls.

Before the settable resin saturated or impregnated in first face sheet 28 is set, an intermediate stiffening element 10 of the present invention is placed upon the first face sheet 28 in a manner so that the stiffening element 10 takes the form of the contoured curved surface of the mold and eventually the boat hull.

After placement of the intermediate stiffening element 10 upon the first face sheet 28, the intermediate stiffening element 10 can be impregnated with a settable resin. Preferably, this is the same resin as utilized in connection with impregnation of the first face sheet 28. This provides for a very unitary structure.

After application of the resin to the intermediate stiffening element 10, and before setting of the resin, a second face sheet 30 is laid up upon the resin impregnated intermediate stiffening element 10 in the same manner as the first face sheet 28 is laid up upon the mold. This second face sheet 30 is of similar material as the first face sheet 28, and is made up of one or more plies of fiberglass matting or woven fiberglass cloth. This second face sheet 30 may be laid up upon intermediate stiffening element 10 while impregnated or saturated with a settable resin, or the settable resin can be used to impregnate or saturate the second face sheet 30 after laying up of the same. Either embodiment can be advantageously carried out in accordance with the present invention.

The settable resin that is used to impregnate or saturate the second face sheet 30 is again preferably the same resin employed to impregnate or saturate first face sheet 28 and intermediate stiffening element 10. Here again, this provides for the most advantageous unitary product.

After laying up the second face sheet 30, and after impregnation or saturation with a settable resin, the resin which impregnates the first face sheet 28, intermediate stiffening element 10 and second face sheet 30 is allowed to set. This provides for a very rigid structure, having a great strength to weight ratio. Removal of the structure from the mold and surface finishing provides the final boat hull.

By adherence to the parameters above, the present invention provides a novel element which has exceptional characteristics, making it particularly useful in the formation of the contoured curved surfaces of a boat hull. For example, the stiffening element of the present invention provides stiffness and strength with a minimum of weight. Moreover, the stiffening element of the present invention can provide insulation and flotation characteristics to any structural element in which it is utilized. Furthermore, the stiffening element of the present invention has been found to possess a minimum of water absorption, particularly when utilizing a closed cell foam and is resistant to attack by many commercial solvents.

A typical stiffening element prepared in adherence to the above parameters is a laminate of 40 lb. Kraft paper as integral skins or sheets with an intermediate polyurethane foam, preferably over 95 percent closed cell. Such a product with dimensions of ¼ inch × 12 inch × 36 inch has a density of about 3.5–4 lbs. per cubic foot, minimal water absorption and a buoyancy of about 1.2 lbs. per square foot. Such product is substantially resistant to solvent attack.

The construction element of the present invention, while particularly applicable in the fabrication of boat hulls, can be used in a vast variety of applications where light weight and strength, as well as insulation properties are important. An example of such applications is as an insulation member for tanks. Where deformability and flexibility in a plurality of directions are not essential, as in the application of the construction element as insulation for tanks, deformability and flexibility in only a single direction can be easily achieved by providing the intermediate stiffening member of the construction element with only a first and second series of spaced slits. All other parameters as above described remain in this alternative embodiment.

Several preferred modes and embodiments of the present invention have been illustrated and described in connection with the particular field of fabricating a fiberglass boat hull, and, more generically, to the production of structural elements having a high strength and stiffness to weight ratio. It should be understood, however, that many other changes and modifications may be made without departing from the spirit and scope of the present invention, with the details and variations indicated above merely being representative of the many details and variations possible in structure, method and field of application of the present invention.

What is claimed is:

1. A construction element comprising:
    a first face layer of settable resin impregnated glass fiber cloth;
    an intermediate stiffening member bonded to said first face layer comprising a laminate of:
    a. a flexible top sheet;
    b. an intermediate foam layer bonded to said top sheet; and,
    c. a flexible bottom sheet bonded to said intermediate foam layer on the side opposite said top sheet; said laminate having:
        i. a first series of spaced slits extending through said top sheet and intermediate foam layer but not through said bottom sheet;
        ii. a second series of spaced slits parallel to said first series of spaced slits and extending through said bottom sheet and intermediate form layer but not through said top sheet;
        iii. a third series of spaced slits perpendicular to said first and second series of spaced slits, said third series of spaced slits extending through said top sheet and intermediate foam layer but not through said bottom sheet; and,
        iv. a fourth series of spaced slits parallel to said third series of spaced slits and extending through said bottom sheet and intermediate foam layer but not through said top sheet;
        said fourth series of spaced slits being offset from said third series of spaced slits; and,
    a second face layer of settable resin impregnated glass fiber cloth bonded to said intermediate stiffening member;
    said settable resins being in the set state.

2. The construction element of claim 1, wherein said intermediate stiffening member is impregnated with a settable resin.

3. The construction element of claim 1, wherein said top and bottom sheets are paper sheets.

4. The construction element of claim 1, wherein said slits in said first series of spaced slits are evenly spaced and said slits in said second series of spaced slits are evenly spaced.

5. The construction element of claim 4, wherein the spacing of said first series of spaced slits is the same as the spacing of said second series of spaced slits.

6. The construction element of claim 5, wherein said first series of spaced slits is offset from said second series of spaced slits a distance equal to about 10 percent to about 50 percent of the distance between adjacent slits in said first and second series of spaced slits.

7. The construction element of claim 6, wherein said first series of spaced slits is offset from said second series of spaced slits a distance of from about one-fourth to one-half inch.

8. The construction element of claim 4, wherein said slits in said third series of spaced slits are evenly spaced and said slits in said fourth series of spaced slits are evenly spaced.

9. The construction element of claim 8, wherein the spacing of said third series of spaced slits is the same as the spacing of said fourth series of spaced slits.

10. The construction element of claim 9, wherein said third series of spaced slits is offset from said fourth series of spaced slits a distance equal to about 10 percent to about 50 percent of the distance between adjacent slits in said third and fourth series of spaced slits.

11. The construction element of claim 10, wherein said third series of spaced slits is offset from said fourth series of spaced slits a distance of from about one-fourth to one-half inch.

12. A construction element comprising:
 a first face layer of settable resin impregnated glass fiber cloth;
 an intermediate stiffening member bonded to said first face layer comprising a laminate of:
  a. a flexible top sheet;
  b. an intermediate foam layer bonded to said top sheet; and,
  c. a flexible bottom sheet bonded to said intermediate foam layer on the side opposite said top sheet; said laminate having:
   i. a first series of spaced slits extending through said top sheet and intermediate foam layer but not through said bottom sheet; and,
   ii. a second series of spaced slits parallel to said first series of spaced slits and extending through said bottom sheet and intermediate foam layer but not through said top sheet, said second series of spaced slits being offset from said first series of spaced slits; and,
 a second face layer of settable resin glass fiber cloth bonded to said intermediate stiffening member; said settable resins being in the set state.

* * * * *